(12) United States Patent
Bishop

(10) Patent No.: US 7,219,397 B2
(45) Date of Patent: May 22, 2007

(54) ELASTIC FORESHORTENING OF CABLE OR OTHER LINEAR STRUCTURES

(76) Inventor: Todd Nicholas Bishop, P.O. Box 6170, Bellingham, WA (US) 98227

( * ) Notice: Subject to any disclaimer, the term of this patent is extended or adjusted under 35 U.S.C. 154(b) by 0 days.

(21) Appl. No.: 10/967,875

(22) Filed: Oct. 18, 2004

(65) Prior Publication Data

US 2006/0080808 A1    Apr. 20, 2006

(51) Int. Cl.
*F16G 11/00* (2006.01)
(52) U.S. Cl. .................. 24/115 R; 24/122.3; 24/713.8; 24/300
(58) Field of Classification Search ............. 24/115 R, 24/122.3, 713.8, 714, 300, 301
See application file for complete search history.

(56) References Cited

U.S. PATENT DOCUMENTS

| | | | | |
|---|---|---|---|---|
| 4,694,541 A | * | 9/1987 | Skyba | 24/301 |
| 4,939,778 A | * | 7/1990 | Tomberlin | 379/438 |
| 4,979,614 A | * | 12/1990 | Ruhaut | 206/702 |
| 6,202,263 B1 | * | 3/2001 | Harker | 24/300 |
| 6,233,796 B1 | * | 5/2001 | van Wassenhove et al. | 28/100 |
| 6,740,818 B2 | * | 5/2004 | Clark | 174/135 |

* cited by examiner

*Primary Examiner*—Robert J. Sandy
*Assistant Examiner*—Marcus Menezes

(57) ABSTRACT

A device wherein an elastic cord is attached to a pre-existing flexible linear structure such as a wire, tube or non-elastic cordage in order to deform the structure and impart elastic handling properties of a common curly cord. The resulting assembly is a foreshortened version of the linear structure that is axially elastic and therefore easier to handle, store and use. The preferred method involves creating attachments between one or more stretched elastic cords and a linear structure at close intervals along the structure, such that when the elastic is allowed to retract, it pulls the linear structure into a series of loops or bends.

10 Claims, 8 Drawing Sheets

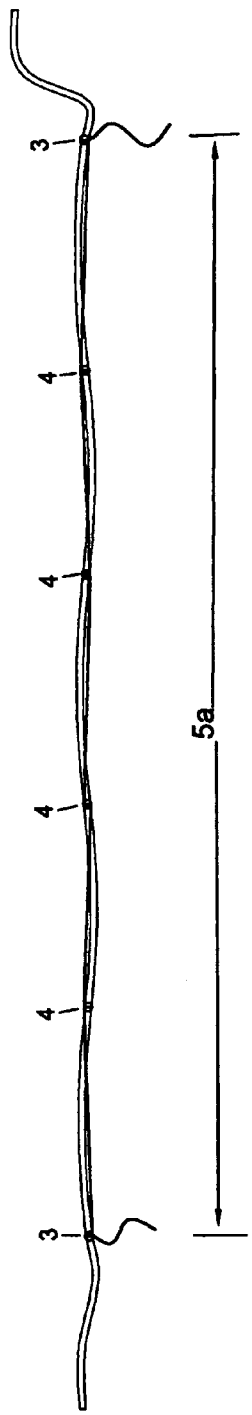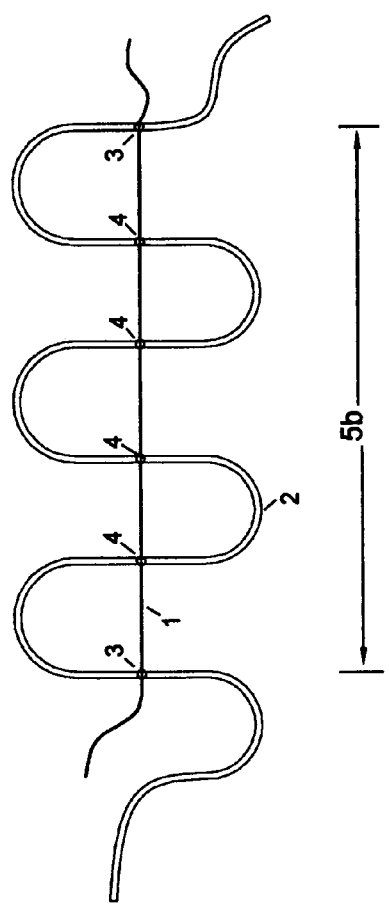
FIG. 1a
FIG. 1b

ELASTIC FORESHORTENING OF CABLE OR OTHER LINEAR STRUCTURES

CROSS REFERENCE TO RELATED APPLICATIONS

Not applicable

FEDERALLY SPONSORED RESEARCH

Not applicable

SEQUENCE LISTING OR PROGRAM

Not Applicable

BACKGROUND OF THE INVENTION—FIELD OF INVENTION

The Curly Cords arrangement is common on all types of cords leashes and tubing, but is most common on telephone handset cords. Currently, these items are manufactured at a cost premium, and are popular for their handling and storage properties. This invention, allows existing, low cost cords, wires or tubes to be partially or completely converted by the consumer, into an assembly that has similar properties to a pre-manufactured curly cord, easily and at a minimum expense. Cords so treated do not tangle as easily as the original cord nor do they entwine and catch like the normal curly cord. This invention may be comprised of a flexible fabric or plastic coverlet for cleanliness and decoration or colored elastic could be used for cord tracing and identification.

BACKGROUND OF THE INVENTION—PRIOR ART

This invention teaches relating elastic cord, strap or tubing to a flexible linear structure such that said structure is foreshortened into a series of loops or bends and is comprised with elastic properties such that it can be significantly stretched to at or near its original length and return to the foreshortened length again. The search did not reveal any prior art pertaining directly to this method.

Elastic cord is defined as a linear cord like material comprised all or in part of elastomeric materials such that the cord can be deformed by stretching it along its major axis until said axis is at least 1.2 times original length and when released the cord returns to at or very near its relaxed dimensions. Elastic cord may take the form of, but not limited to fabric covered natural rubber cord like bungee material or sewing elastic, or solid elastomeric cord manufactured from a natural or synthetic elastomer such as beading-stringing cord, or it may be rubber tubing or strapping.

Foreshortening of a linear structure is defined as causing the structure to take an alternate shape such as a combination of loops and or bends that if fully implemented, reduces the installed length of the structure by about 20% or more. An option is provided to adjust the effective length of the elastic cord, so the functional percentage of foreshortening may be adjusted from 20% to the maximum elongation of the elastic cord.

A linear structure is primarily defined as a single wire, tube, cable or similar structure, which would be the normal application for this invention. However it may also be a light bundle of said structures assuming the bundle retains enough flexibility to allow foreshortening.

U.S. Pat. No. 6,740,818, Clark CORD COVER AND DEPLOYMENT MEMBER AND METHODS OF USE Pertains to the means to apply a flexible sheath over a wire or cable. The concept of sheath itself is not claimed therein and is assumed to be public information. This invention involves the use of a sheath as a dependent claim.

Elastic, in-line shock absorbers are commonly used to prevent damage to boats and docks when tie-down lines pull tight on a moored vessel. While the structure of an elastic shock absorber appears similar to this invention, there are many more fundamental differences both in structure and in application. Shock absorbers are necessarily very rigid and provide limited axial buffering, only to absorb heavy shock and not to improve handling properties of the line. Buffers are very short and do not as a percentage of total length, significantly foreshorten the line, as this is not the intent of their application.

U.S. Pat. No. 6,233,796 May 22, 2001, von Wassenhove, WIRING HARNESS BUNDELING teaches pre forming a series of loosely knotted slip knots from lacing cord or yarn into a set and sliding the set over a free end of a linear substrate and pulling on the ends of the set, thereby tightening each knot sequentially onto the substrate for the purpose of quickly binding several wires into a bundle. Von Wassenhove defines a slip knot as a knot formed by a loop in a single cord to describe the looped version of FIG. 1 or an interarrangement of loops whereby the position of each loop is dependent on tension in the cord to define the braided chain-not configuration illustrated in FIG. 5. Further, a loosely knotted loop is defined as a loop that is larger in diameter than said substrate. In its broadest claim, von Wassenhove states: A method of applying a knotted lacing yarn to a bundle of elongated substrates comprising the steps of forming a set of loosely knotted side-by-side loops of larger diameter than the bundle from a continuous length of lacing cord. Placing the set of loops over a free end of said bundle and securing at least the first loop of said set to said bundle, followed by progressive lengthwise displacement of said set of loops away from said first loop lengthwise of the bundle so as to progressively tighten successively knotted loops about the bundle of spaced intervals along the length of the latter Von Wassenhove further claims in FIG. 4 and dependent claim 2 a tapered set of loops, each having sequentially greater diameter, a braided assembly and several methods for binding the set of loops into a tubular fabric structure so that it can be easily handled and placed over a free end of the linear bundle for distribution.

Von Wassenhove produces a bundled wire that is not foreshortened and is without enhanced elastic properties. It is clearly intended to be used to securely tie multiple wires or other linear structures together into a bundle. The title of the patent states it, as do the specification and the claims. There would be no reason to apply von Wassenhove to anything but a bundle. That is an entirely different result than this invention.

FIGS. 1 through 5 illustrate that the invention may be added to a portion, but riot the entire length of a flexible linear structure. The lengths of linear structure and elastic cord that are located between the primary attachment points are referred to herein as the functional length of the elastic and the linear structure. This is also referred to as the "assembly", and is that part of the linear structure that is elastically foreshortened by the invention.

This invention relates generally to attaching stretched elastic cord to electric cables, or other linear structures, causing them to be foreshortened. This requires at least two fixed primary attachment points between the elastic and the linear structure to be foreshortened. The primary attachment points are located at the effective ends of the installed, functional length of stretched elastic cord. One or more primary attachment points may be adjustable to allow increasing the length of the elastic cord to the minimum definition of foreshortening at the users discretion. Primary attachment points are generally fixed rather than sliding in nature and may be comprised of a knot, tie, mechanical clip, shrink material, tape, plastic wrap or other means. It is generally required that the elastic be at least loosely connected to the linear structure continuously or at intervals along the installed length as well. The connections are identified as secondary attachment points and may be fixed or sliding in the form of knots, mechanical clips, loops, helical springs, glue joints, tape, shrink materials or plastic wraps. Alternatively, secondary attachment means may be a flexible coverlet or tubular shroud, providing a sliding connection between the elastic and the linear structure allowing the entire assembly to extend and to be retracted by the elastic. A string or some other means may be provided in the shroud to facilitate inserting the linear structure through the shroud.

The installed length is defined as the length of elastic cord in a stretched condition between the primary attachment points that is less than or equal to the total length of the linear structure and defines the functional length of the linear structure that is to be foreshortened by the invention.

The preferred method of attachment between the elastic and linear structure is primary and secondary attachment points being comprised of a series of firmly attached slip-knots in the elastic, fixing the elastic to the linear structure at regular intervals. In order to produce an unobtrusive and visually pleasing end result using this means, it is generally preferred that the attachment points between the cord and wire be close together to produce small and uniform bends in the foreshortened structure. With a slipknot arrangement, the distance between the attachment points is determined largely by the diameter of the preformed loops in the elastic. Most cords have features on the free end such as connectors and static absorbers that define the effective outer diameter of the linear structure so the elastic loop must be larger than said effective diameter. Getting a close knot pattern may require pre-stretching the elastic. For that reason, the preferred embodiment teaches that the elastic loops FIG. 5 describes how contact between the flexible sheath 5 and the linear structure 2 is not continuous because the sheath 5 is flexible but not elastic; therefore it bunches as the elastic cord retracts and the linear structure deforms. This results in a plurality of locations where the elastic cord bears on the fabric sheath 23 and the sheath pulls on the linear structure 24. These attachment points are many, may be wider than a single point and are located in random places along the functional length of the linear structure, but they are, not continuous. be tightly knotted and stretched around a supportive tubular structure having an internal diameter greater than the largest feature on the cord or tube. Without said support, the relaxed elastic loops may be smaller than the effective diameter of the substrate. Further, it is important to this invention that the knots, comprised of the primary loop are tight so that they resist pull of the secondary loop about the linear substrate. This causes the elastic between the knotted attachments to be stretched completely out during installation, before the knots are tightened.

Von Wassenhove specification refers to a tapered or conical Former that is presumably tubular, but the lashing yarn is loosely knotted around said Former. The Former structure is not mentioned in the claims. None of the claims von Wassenhove provide for an internal. support for the cord of any kind, nor is there any mention of elastic materials, so this invention was clearly not intended for and would not be useful for the purposes of forshortening and imparting elastic axial properties to a single wire.

SUMMARY

No prior art was found regarding the specific use of elastic cord, to modify existing wires, tubes or cordage by foreshortening them and making them axially elastic. One patent described an installation process that relates to chain knot aspect of the preferred embodiment but not to the elastic concept. Said patent describes parts of the chain-knot process but does not describe some of the critical features required for this invention, nor does it achieve the same results.

BRIEF DESCRIPTION OF THE DRAWINGS

FIG. 1a is a linear structure having an extended elastic cord attached, showing primary and secondary attachment points and an installed length 5.

FIG. 1b is the same assembly as FIG. 1a but in the foreshortened condition. Also showing generic primary and secondary attachment points and the foreshortened installed length 5b.

THE PREFERRED EMBODIMENT

The invention may take several forms depending on the type of linear structure that is to be foreshortened and the application in which it may be used. For instance, the wires on the back of a computer may be best suited for a multiple attachment elastic cord without a sheath because it is simple and inexpensive. For the mouse cord however, a sheathed configuration with only two attachment points may be best.

Figure 9:
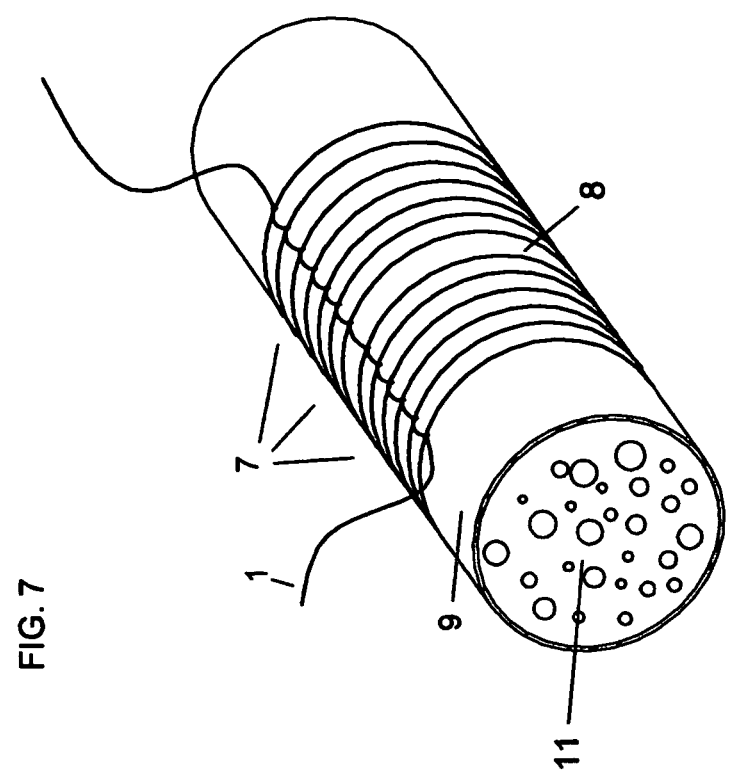
FIG. 9 describes the preferred, but not the only allowable retentive knot that is loosely positioned on a tubular support, showing the relative positions of the primary and secondary loops.

FIG. 9 describes a typical tightly knotted loop in a loosened condition and is comprised of and elastic cord 1, having a primary 7 and secondary loops 8. The primary loop 7 forms a tightened knot around said secondary loop 8 such that clamping forces from the primary loop severely restrict but do not fully prevent tightening of the secondary loop. With elastic cord, this generally means up to as tight as it can be pulled without damaging it. The tightened primary loop or knot is important because during installation, it resists tightening of the secondary loop around the linear structure until the elastic between the knots if fully extended, imparting elastic properties to the assembly. FIG. 9 further describes the preferred knot for this application: A single overhand knot or primary loop with the secondary loop pulled through. This knot is preferred because it is secure, simple and the secondary loop pulls out from only one direction assuring an even distribution of knots although other knot arrangements are allowed.

Figure 7:
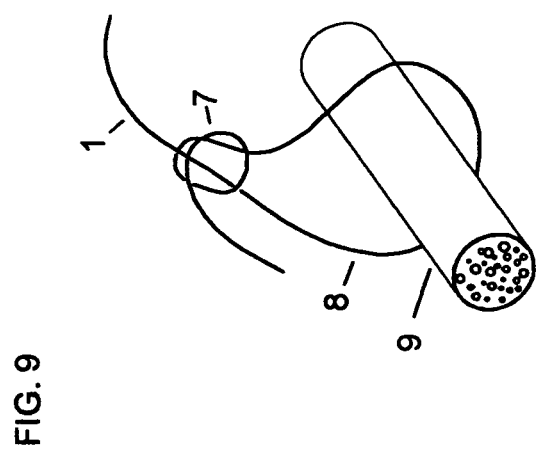
FIG. 7 is a tightly knotted set of elastic cord loops, positioned on a tubular support with supportive filler inside the support.

A typical embodiment of this invention shown in FIG. 1b may be comprised of a functionally single length of elastic cord 1 having been substantially stretched axially and having been knotted tightly and securely to a linear structure 2 on regular intervals along its axial length 3, 4. The means for applying said elastic cord is as follows:

FIG. 7 shows A set of slipknots 7 in a single length of linear elastic or elastomeric material 1 is tightly knotted around the exterior of an internal supportive structure such as a thin tube 9. Said knots 7 are positioned such that they are side-by-side with minimum free cord between them. The elastic cord has been substantially axially extended during the knotting process so that the secondary loops 8 it is held in an expanded condition. If commonly available natural or latex rubber fabric covered elastic cord is used, it would be preferable to extend it almost to its full elastic capability, or about 2 times relaxed length. This assures the closest feasible knot pattern on the final product and simplifies the manufacturing process. However, full extension is not required.

Figure 8:
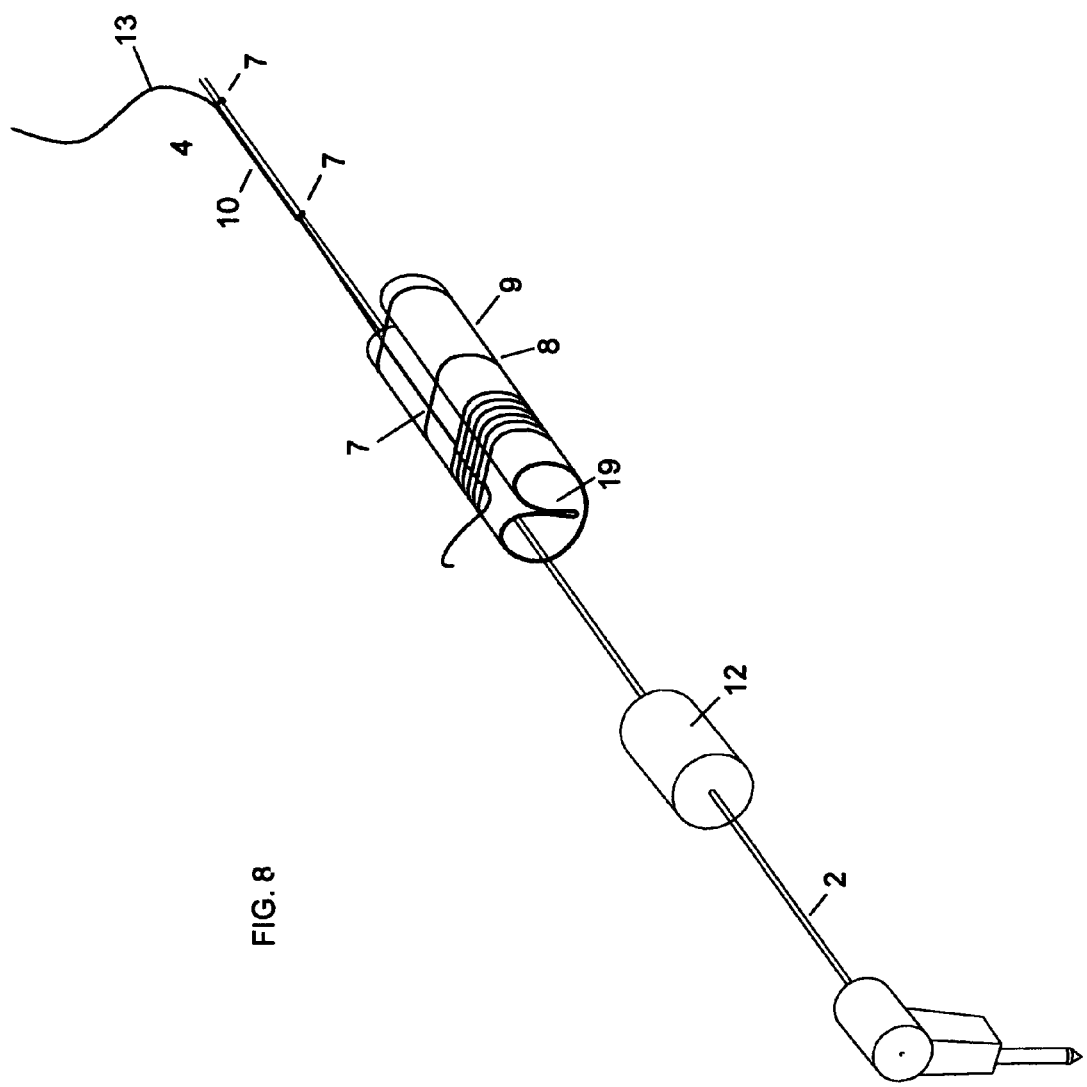
FIG. 8 is a version of FIG. 7 wherein the supportive filler has been removed from the tubular support and said support has been displaced over a free end of a linear structure having features including a connector and static absorber. The support has been buckled around the linear structure and two secondary loops from the tightly knotted set have been drawn off an end of the support and tightened onto the linear structure.

FIG. 8 illustrates how said support may be a commonly available thin, deformable tube 9 that is marginally strong enough to support the elastic pressure from the tightly knotted secondary loops 8. To assure that the support remains intact, said support may be internally support by some inexpensive, removable filler or structure like foam, paper or cardboard 11. It is preferable that there be a close fit between the interior of the support tube 9 and the largest feature on the free end of the linear structure 12 to achieve the closest reasonable knot pattern.

After removing the filler material 11, the support tube 9 having a set of tightly knotted elastic slipknots 7 on the outside is placed over a free end of the linear structure 2. A free end of the elastic cord 13 is held or attached onto a location on the linear structure 1 and the supporting tube 9 and slip knots 7 are pulled along the major axis of the structure so that the knots 7 pull one-by-one off of the end of the supporting tube and are sequentially tightened about the diameter of the linear structure 2 with the free elastic between the knots 10 being substantially fully extended. If the cord is tightly knotted onto the support to at or near its full elastic capability, it will be necessary to provide a means to slide the knots individually down the support and off of one end without binding. This may be accomplished by a variety of methods but the preferred means shown in FIG. 8. is by collapsing or axially buckling the thin deformable tube 9 with light external pressure causing its effective diameter to significantly reduced. Tension in the secondary loop 8 of the elastic cord 2 is thereby is significantly reduced allowing displacement of the knot 7 along the support 9.

It is also anticipated that an alternative method for releasing the knots such as a support tube having an axial cut, that is displaced causing the tube to collapse or some other mechanical means to reduce the diameter of the support tube could be used.

A tapered diameter support tube may be used to allow the tightened knots 7 to displace with a matching set of tapered diameter knotted loops. This is anticipated but not preferred because it complicates manufacturing and would cause the distance between the knots to vary on the finished product.

Figure 2:
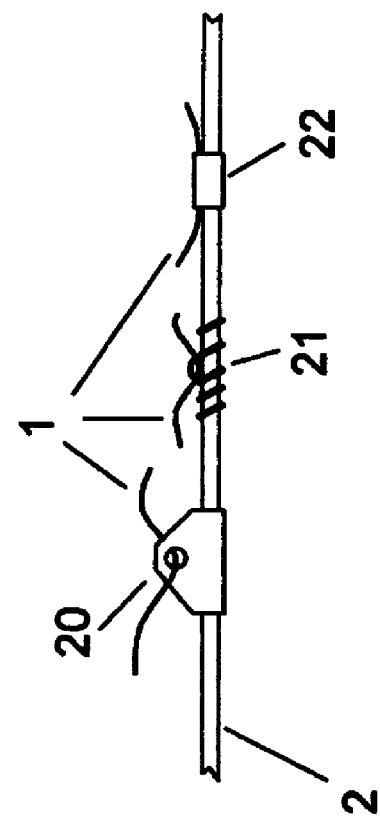
FIG. 2 is a section of linear structure showing alternative attachment means.
Figure 3A:
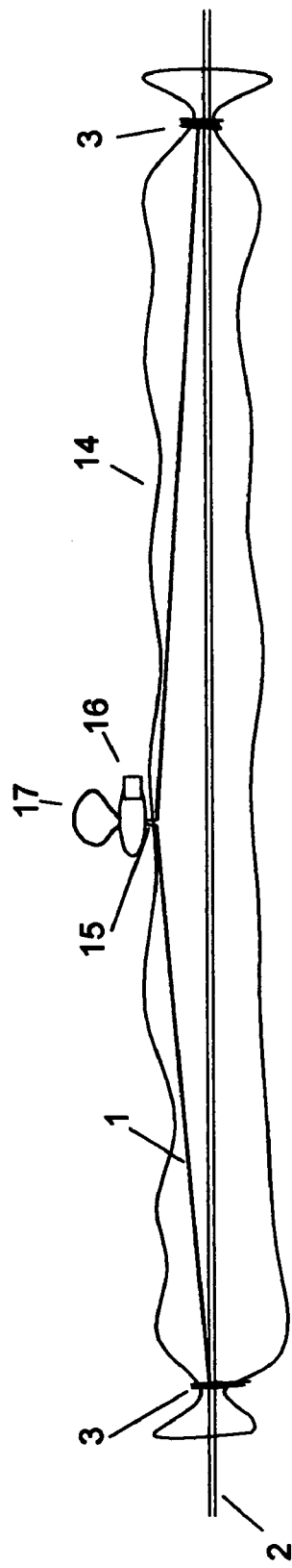
FIG. 3 is a linear structure with elastic cord assembly with primary attachment points and sheath showing optional adjustability feature for the elastic cord. Elastic is shown in a extended condition such that the assembly, under free conditions would foreshorten to the minimum definition of foreshortening if released.
Figure 3B:
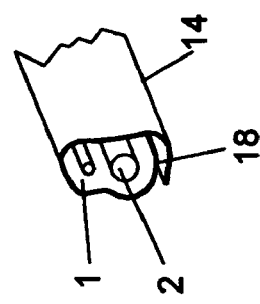
Figure 4:
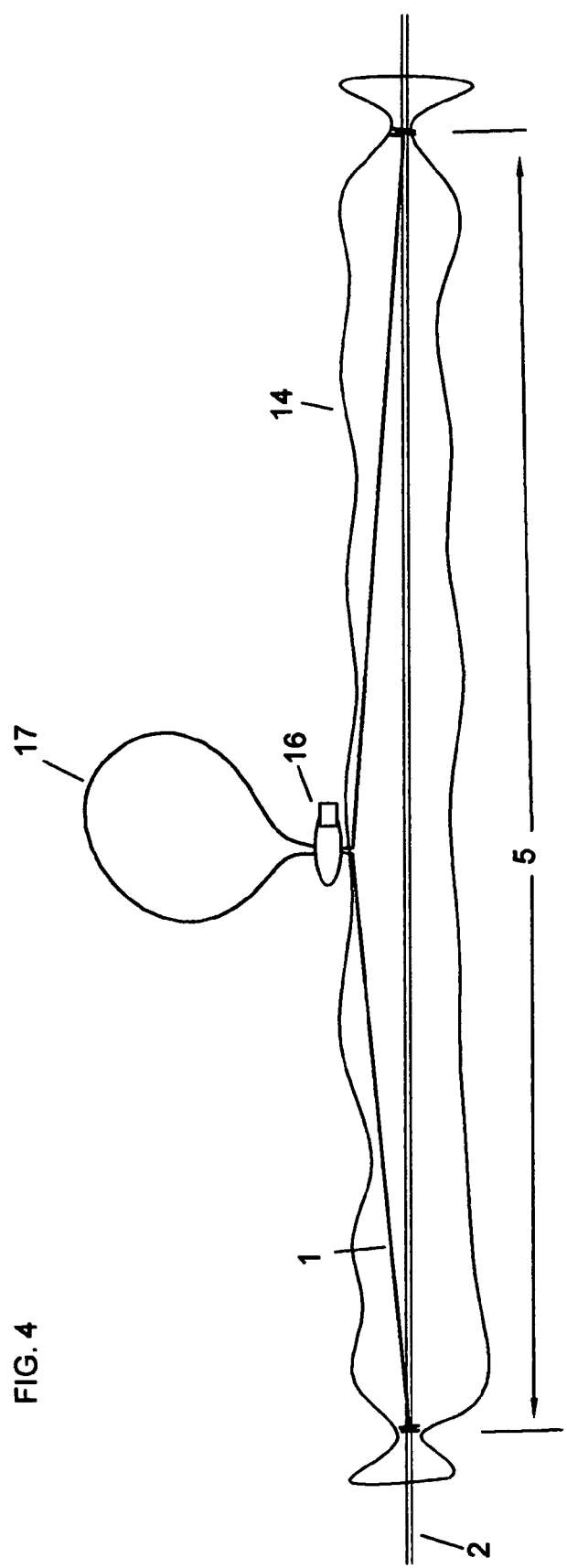
FIG. 4 is a linear structure with elastic cord attached, having primary attachment points and sheath showing optional adjustability feature for the elastic cord. Cord is attached at its installed length so that elastic foreshortening is maximized FIG. 5 describes a foreshortened version of FIG. 4.
Figure 5:
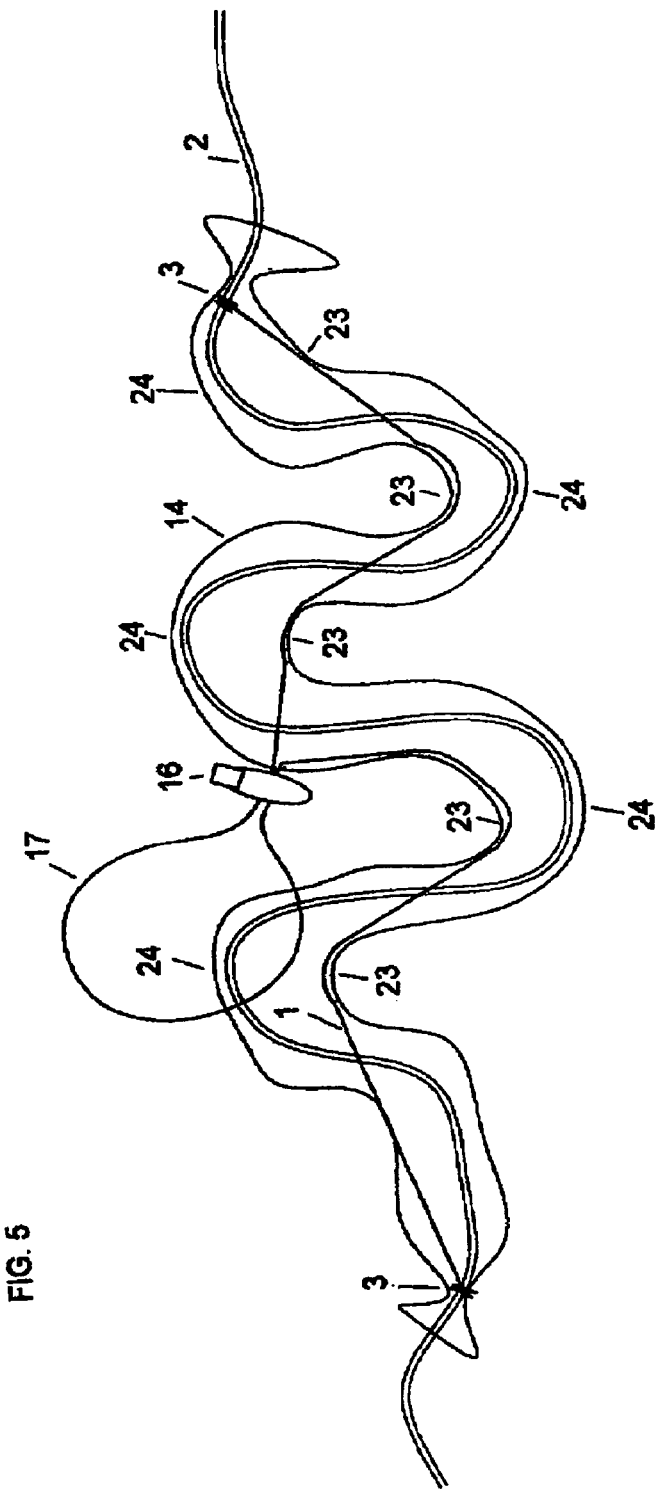

Optionally FIGS. 3, 4 and 5 describe how, a fabric or flexible plastic sheath 14 may be placed over the assembled elastic and linear structure to protect and visually improve it. The sheath will be loose fitting and will normally be as long as the installed length 5 of the elastic cord 1. It will be generally loose fitting, but as tight as practical, given the largest diameter of the linear structure 12. The sheath 14 is known to improve the function of the assembly by protecting the material of the elastic cord 1 from the elements and by forcing the elastic cord 1 to follow the linear structure 2 more closely, amplifying the foreshortening effect. If the sheath is too tight it will have a negative effect on the foreshortening. The sheath may be a wrap as described in FIG. 3b having a joining method at an axial seam 18 such as a zipper, hook and loop, buttons, snaps molded plastic seal or other method. The wrap would not have to be larger than features the free end of the linear structure.

OPERATION OF THE PREFERRED EMBODIMENT

The filler material 11 will be removed from the inside of the tubular support structure, said support structure having the set of tightly knotted loops 7 as shown in FIG. 7 and slide an open end of the tubular support over a free end of the linear structure 2. After moving the support to the desired location on the linear structure 2 as described in FIG. 8, the tubular support is collapsed 19 by putting light pressure on the outer diameter, deforming it until the pressure from the elastic cords 1 cause the support to axially buckle 19. A free end of the elastic cord 13 will be held in place and the buckled support tube will be displaced axially down the length of the linear structure per FIG. 8 until all of the loops 8 have been displaced off of the tube and tightened on the outer diameter of the linear structure 2. Once completed, the wire and elastic are released and the elastic is allowed to pull the formerly linear structure into a series of loops and or bends, foreshortening it and giving it axially elastic properties. If desired, a fabric sheath 14 may be pulled over the assembly to protect and shield it.

ALTERNATIVE EMBODIMENTS

This invention may take, but is not limited to the following embodiments:

An elastic cord having and installed length with primary attachment means. Said attachment means may be but is not limited to a knot 7, clip 20, tie, tape 22, helical spring 21, shrink material 22 or glue. Once attached to a linear structure, the combination of the attached elastic and linear structure is enclosed on a loose-fitting fabric or plastic tubular coverlet that is at least as long as the installed length. When released the entire assembly is foreshortened.

Alternatively, a length of extended elastic cord could be attached at the ends to the coverlet as shown in FIG. 4 such that when the linear structure is inserted into the extended coverlet attached to the linear structure at the ends. The entire assembly is foreshortened when released FIG. 5.

Figure 6:
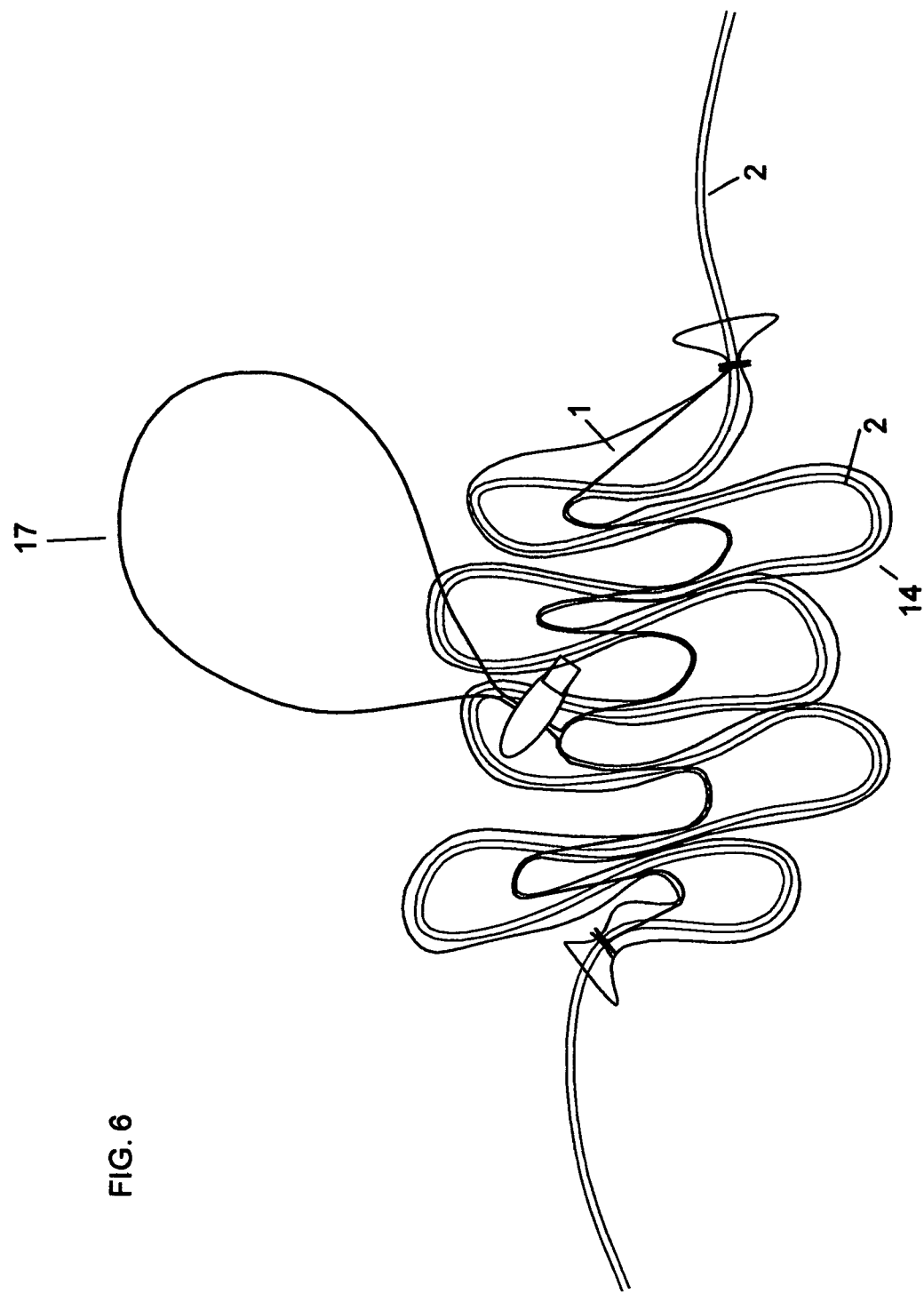
FIG. 6 describes a fully retracted and foreshortened version of FIG. 4.

A further improvement of the coverlet is achieved by extending an adjusting loop 17 of the elastic cord 1 or an free end of the elastic cord through an opening 15 in the material of the shroud or other portal, said adjusting loop or end having a common adjusting device like a cord clamping bead 16 so that the effective length of the elastic cord 1 within the coverlet 14 can be adjusted by the user, who could thereby elastically lengthen or shorten the assembly per FIG. 5 or even draw it up into a tight bundle for storage FIG. 6.

Alternatively, the shroud 14 may take the form of a loose fitting and intrinsically elastic fabric or elastomeric plastic shroud or a non-elastic shroud into which an elastic cord has been pocketed or sewn in its extended state. Said shroud 14 is extended, and the ends of the shroud are fixed to the linear structure. When released, the assembly retracts into a foreshortened series of loops and or bends FIG. 1a.

An elastic cord 1, prepared to be fixed at its ends 4 to a linear structure with the attachment occurring in the extended state of the elastic. The elastic cord being fitted with multiple attachment means 7, 21, 22 such that said means are fixed to the linear structure 2 and sliding on the elastic cord 1 or conversely, fixed on the elastic 1 and sliding on the linear structure 2. Optionally, a loop of said elastic cord 17 may be pulled through the sliding attachments from the middle so the elastic length of the assembly can be adjusted and the ends of the assembly are brought together in a bundle for storage.

I claim:

1. An apparatus to foreshorten and impart axially elastic handling properties to a flexible linear structure having an extended functional length, comprised of a stretched, functional length of elastic cord that is substantially equal in length and positioned substantially parallel to said extended, functional length of said flexible linear structure and is firmly attached to the linear structure at primary attachment points, each primary attachment point located at a functional end of said stretched elastic cord and the elastic cord held in proximity to the linear structure by fixed and slidably fixed secondary attachment points along the functional length of the linear structure such that, when the elastic cord is allowed to relax, tension in the elastic cord pulls the apparatus into a series of loops or bends.

2. The apparatus of claim 1 wherein the elastic cord is comprised of at least two parallel cords.

3. The invention of claim 1 wherein the elastic cord is attached to the linear structure at the primary and secondary by attachment points are a knot in the material of the elastic cord having at least one loop around the material of the linear structure.

4. The apparatus of claim 1 wherein the primary and secondary attachment points are selected from the set of mechanical clips, glue joints, helical springs, shrink material, plastic wrap and tape.

5. The apparatus of claim 1 wherein the functional length of the linear structure and the elastic cord are contained within a flexible fabric or planar sheet sheath forming a tube having a diameter that is loosely fitting over the linear structure and the elastic cord, said sheath being at least as long as the stretched and functional length of the elastic cord and linear structure and is surrounding them such that the elastic cord and the linear structure are held in proximity to each other by the sheath, the tension in the elastic cord causing the elastic cord to put sliding lateral pressure on an inner surface of the sheath as it retracts such that an opposite side of the sheath is pulled into contact with the linear structure, thereby forming a plurality of random, sliding said secondary attachment points between the elastic cord and the linear structure.

6. The apparatus of claim 1 wherein the material of the elastic cord is comprised of an adjustable loop of excess and non-functional elastic cord located between said functional ends of the elastic cord, and the diameter of said adjustable loop can be varied to allow increasing and decreasing said functional length of the elastic cord.

7. The apparatus of claim 1 wherein at least one primary attachment point at said functional ends of the elastic cord has an adjustable attachment means such that it may be secured and released to displace said firm, primary attachment point along said functional length of the elastic cord to change the functional length of the elastic cord.

8. The apparatus of claim 1 wherein the elastic cord is held to the flexible linear structure along its functional length by a series of loops in the material of the elastic cord that form knots, binding the elastic cord around the material of the linear structure such that said knots are distributed along the linear structure and the stretched length of the elastic cord substantially equals the extended functional length of the flexible linear structure.

9. The apparatus of claim 8 wherein said series of loops in the elastic cord, forming said knots, at least one loop of which is slippable and is formed around a tubular support structure, such that the tubular support structure can be displaced over said end of the linear structure along the central axis, and an end of the elastic cord is secured to the linear structure and the series of loops deposited sequentially off an end of the tubular support structure as it is displaced along the linear structure, stretching the elastic cord and tightening said slippable loop onto the linear structure.

10. The apparatus of claim 9 wherein the tubular support structure is a deformable tube that is strong enough to support the pressure of the stretched elastic cord, but can be deformed by external finger pressure during application, causing the tubular structure to radially buckle along its axis, thereby reducing its functional outside diameter so that the knots can be deposited off said end of the buckled tubular support structure.

* * * * *